US008832653B2

(12) United States Patent  
Martick

(10) Patent No.: US 8,832,653 B2  
(45) Date of Patent: Sep. 9, 2014

(54) CENTRALIZED, OBJECT-LEVEL CHANGE TRACKING

(75) Inventor: Christian Martick, Berlin (DE)

(73) Assignee: SAP AG, Walldorf (DE)

( * ) Notice: Subject to any disclaimer, the term of this patent is extended or adjusted under 35 U.S.C. 154(b) by 62 days.

(21) Appl. No.: 13/353,113

(22) Filed: Jan. 18, 2012

(65) Prior Publication Data

US 2013/0185701 A1 Jul. 18, 2013

(51) Int. Cl.
*G06F 9/44* (2006.01)
*G06F 9/445* (2006.01)

(52) U.S. Cl.
USPC ........... 717/121; 717/108; 717/116; 717/120; 717/168; 717/170

(58) Field of Classification Search
None
See application file for complete search history.

(56) References Cited

U.S. PATENT DOCUMENTS

| | | | |
|---|---|---|---|
| 6,698,013 B1 * | 2/2004 | Bertero et al. ................ | 717/127 |
| 7,325,168 B2 * | 1/2008 | Bradley et al. ................ | 714/45 |
| 8,091,082 B2 * | 1/2012 | Malik et al. ................... | 717/168 |
| 8,255,363 B2 * | 8/2012 | Johnson et al. ............... | 707/638 |
| 8,359,580 B2 * | 1/2013 | Gonzales et al. .............. | 717/128 |
| 8,418,147 B1 * | 4/2013 | Odenwelder et al. ......... | 717/128 |
| 2003/0182652 A1 * | 9/2003 | Custodio ....................... | 717/122 |
| 2004/0015860 A1 * | 1/2004 | Craft et al. .................... | 717/122 |
| 2004/0216090 A1 * | 10/2004 | Kaler et al. .................... | 717/121 |
| 2006/0259502 A1 * | 11/2006 | Marshall et al. .............. | 707/101 |
| 2007/0256050 A1 * | 11/2007 | Behnia et al. ................. | 717/104 |
| 2009/0055802 A1 * | 2/2009 | Crosby ........................ | 717/125 |
| 2009/0210852 A1 * | 8/2009 | Martineau ..................... | 717/101 |
| 2009/0235232 A1 * | 9/2009 | Malik et al. ................... | 717/120 |
| 2011/0055826 A1 * | 3/2011 | Vidal et al. .................... | 717/177 |
| 2013/0227526 A1 * | 8/2013 | Imrey et al. ................... | 717/122 |
| 2014/0013310 A1 * | 1/2014 | Crosby ......................... | 717/125 |

* cited by examiner

*Primary Examiner* — Isaac Tecklu  
(74) *Attorney, Agent, or Firm* — Brake Hughes Bellermann LLP

(57) ABSTRACT

An update handler may determine object change data characterizing changes made to software objects. A change data manager store the object change data in a tracking database in conjunction with an object identifier for each changed software object. A query handler may receive an object-specific query requesting a subset of the object change data, and a response generator may provide the subset of the object change data from the tracking database, based on the corresponding object identifiers.

18 Claims, 11 Drawing Sheets

CENTRALIZED, OBJECT-LEVEL CHANGE TRACKING

TECHNICAL FIELD

This description relates to object-based software landscapes.

BACKGROUND

Object-based software generally refers to software constructed and executed using discrete entities, which perform corresponding functions, store relevant data, and/or interact with one another within and across software applications to achieve a desired result. The use of such software objects also provides a platform for relatively fast and efficient updates to existing software applications, and for the creation and construction of new software applications.

Many businesses and other enterprises may utilize such object-based software environments across an entirety of their respective Information Technology (IT) landscapes. Generally speaking, relatively large enterprises generally have correspondingly large IT landscapes. Moreover, within such IT landscapes, a large number of engineers, administrators, and other authorized users may be enabled to make changes to the many software objects thereof.

For example, a business may have offices and a corresponding IT landscape which span a large geographical area, and which employ a large number of employees. Of these, different employees maybe authorized to perform certain specific changes to some or all of the software objects of the IT landscape. For example, some software engineers may be tasked with developing new software objects, while the same or different engineers may be tasked with testing developed software objects before the deployment thereof. Finally, the same or different engineers, as well as authorized administrators, may be tasked with overseeing the productive use of the software objects for their intended purposes within the IT landscape.

Thus, in the above and similar scenarios, changes to software objects may be numerous and frequent, and they originate at one of many different sources within the larger IT landscape. However, although the substance of such changes to the content and functionality of a particular software object may be persisted across the IT landscape for all users, it is difficult or impossible in conventional object-based software environments to track or otherwise determine (in a timely and efficient manner) object change data characterizing a manner in which such changes are performed over time. Thus, for these and other reasons, it remains difficult for providers and operators of object-based software environments to manage those software environments in a manner that is efficient, productive, or otherwise optimized.

SUMMARY

According to one general aspect, a system may include instructions recorded on a computer-readable medium, and executable by at least one processor. The system may include an update handler configured to cause the at least one processor to determine object change data characterizing changes made to software objects, and a change data manager configured to cause the at least one processor to store the object change data in a tracking database in conjunction with an object identifier for each changed software object. The system may include a query handler configured to cause the at least one processor to receive an object-specific query requesting a subset of the object change data, and a response generator configured to cause the at least one processor to provide the subset of the object change data from the tracking database, based on the corresponding object identifiers.

According to another general aspect, a computer-implemented method for executing instructions stored on a computer readable storage medium may include determining object change data characterizing changes made to software objects, storing the object change data in a tracking database in conjunction with an object identifier for each changed software object, receiving an object-specific query requesting a subset of the object change data, and providing the subset of the object change data from the tracking database, based on the corresponding object identifiers.

According to another general aspect, a computer program product may be tangibly embodied on a computer-readable storage medium and may include instructions that, when executed, are configured to determine object change data characterizing changes made to software objects, store the object change data in a tracking database in conjunction with an object identifier for each changed software object, receive an object-specific query requesting a subset of the object change data, and provide the subset of the object change data from the tracking database, based on the corresponding object identifiers.

The details of one or more implementations are set forth in the accompanying drawings and the description below. Other features will be apparent from the description and drawings, and from the claims.

DETAILED DESCRIPTION

Figure 1:
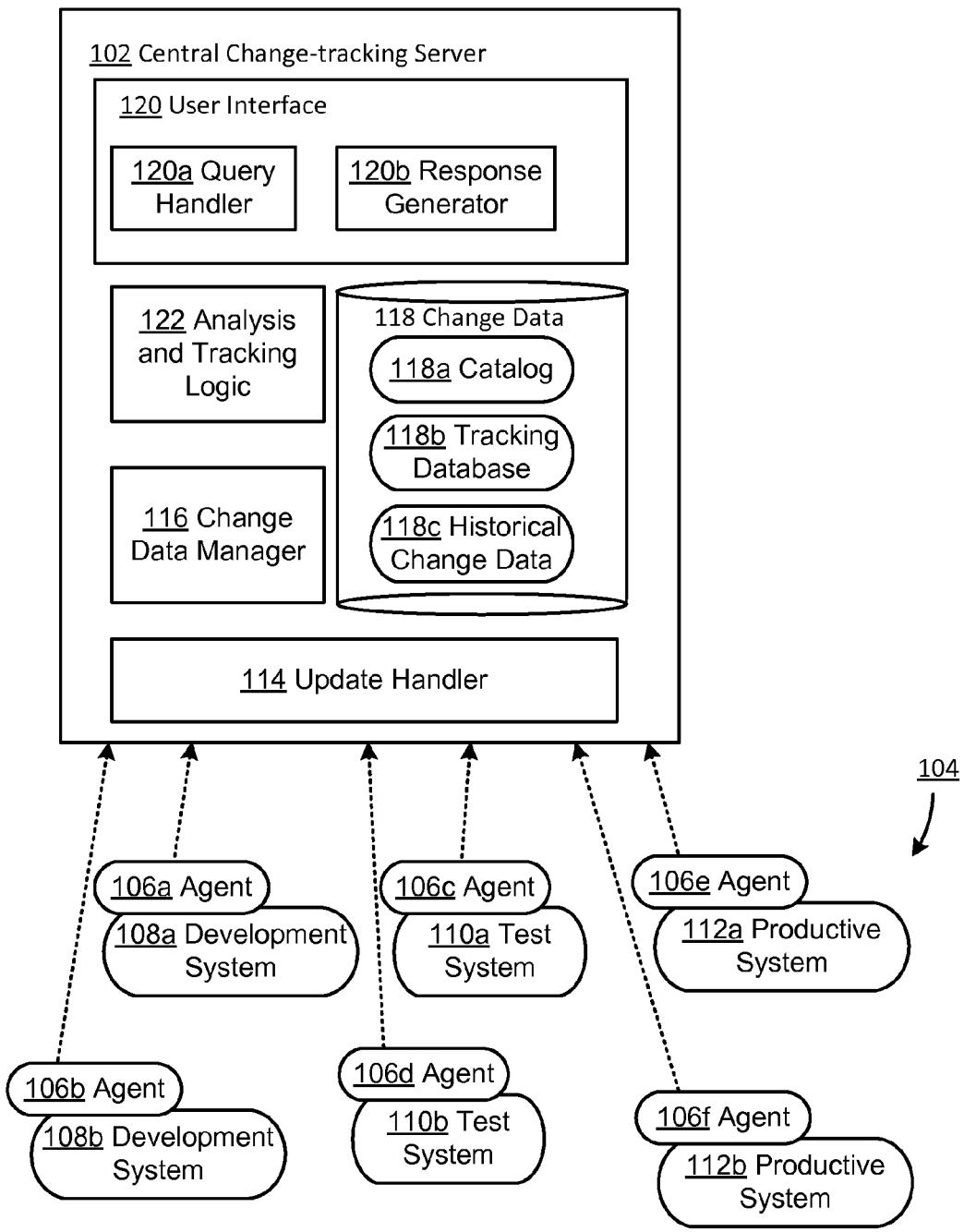
FIG. 1 is a block diagram of a system for object change tracking in a distributed IT landscape.

FIG. 1 is a block diagram of a system 100 for tracking object change data in a distributed IT landscape. In the example of FIG. 1, the system 100 provides a highly flexible and powerful infrastructure to enable change administrators to track their own changes, as well as changes submitted by other authorized users, and at a level of granularity needed for any given scenario. More specifically, as illustrated in FIG. 1 and described in detail below, a central change tracking server 102 may be configured to enable end users to efficiently track changes from the level of a single object ranging up to a status of an entire project.

In the example of FIG. 1, the central change tracking server 102 is illustrated as operating in the context of an IT landscape 104. Of course, it will be appreciated that such IT landscapes, in practice, may vary greatly, and therefore may include many additional or alternative aspects not specifically illustrated in the example of FIG. 1. Thus, the IT landscape 104 of FIG. 1 should be understood to represent a non-limiting example of an IT landscape, to show that the central change tracking server 102 may correspondingly be understood to be operable in any and all such variations of the IT landscape 104.

In the specific example of FIG. 1, the IT landscape 104 is illustrated as including a plurality of agents 106a-106f, each of which is configured to execute in conjunction with a corresponding component or system of the IT landscape 104. Particularly, as shown, agents 106a, 106b are illustrated as operating in conjunction with development systems 108a, 108b, respectively. Similarly, the agents 106c, 106d are illustrated as operating in conjunction with test systems 110a, 110b, respectively, while the agents 106e, 106f are illustrated as operating in conjunction with productive systems 112a, 112b.

In this regard, it may be appreciated that the productive systems 112a, 112b generally represent the functioning applications deployed and operating for a designed purpose within the IT landscape 104. For example, in a business context, the productive systems 112a, 112b may represent software applications for managing business operations, including, e.g., inventory or supply chain management, customer relationship management, enterprise resource planning, or other aspects related to the management and operation of an associated business.

In general, such productive systems may be supported by a set of preceding systems, represented in the example of FIG. 1 by the development systems 108a, 108b and the test systems 110a, 110b. As is known, such preceding systems may be designed and configured to facilitate updates and other changes to the productive systems 112a, 112b, as well as to assist in the general operation and management of the productive systems 112a, 112b.

In particular, for example, changes to the productive systems 112a, 112b, may generally be required to be implemented in the development systems 108a, 108b and/or over the test systems 110a, 110b, rather than within the productive systems 112a, 112b themselves. In this regard, a change may be understood to represent any adjustment to the software of the productive systems 112a, 112b, e.g., changes to the programming code thereof, or any change in the configuration thereof.

Such changes may be created within the appropriate development system 108a, 108b, and then may be tested in the context of a corresponding, appropriate test system 110a, 110b, where the test systems 110a, 110b may be understood to be more or less exact replicas of the productive systems 112a, 112b. In this way, test or quality assurance may be provided, without risk to the productive systems 112a, 112b.

Of course, the example in FIG. 1 represents a simplified example provided for the sake of explanation, so that the IT landscape 104 may be understood to be potentially enhanced to implement, e.g., layered development practices, multiple independent test environments, training systems, and other known components or subsystems of IT landscapes.

In the context of such multiple systems, processes may be defined which govern propagations of changes through the IT landscape 104, e.g., from the development system 108a to the test system 110a, and ultimately to the productive system 112a. Such processes govern, e.g., when and how such changes may be initiated within an appropriate development system, and which software objects may be accordingly affected. Similarly, the processes may govern when and how a successful change may be deployed to a corresponding test system 110a, and, ultimately, may govern when and how a particular change will be deployed to the corresponding productive system 112a.

In general, each business or other organization which desires to execute and support the productive systems 112a, 112b may have its own proprietary or more or less individualized change processes in place for governing such changes within the IT landscape 104. Moreover, depending on the size of the organization, its IT infrastructure, and the size of the change of human engineers implementing the changes, a scope and size of such changes may vary in scale, e.g., from very high level approval and management implementations, to definitions of single software objects.

In the context of FIG. 1, as described in detail below, the central change tracking server 102 may be configured to track, independently of the variables just described, all such actual changes to the various systems with the IT landscape 104, thereby making such changes transparent across the whole IT landscape 104, so that administrators and other users of the central change tracking server 102 may understand and govern such changes. Moreover, the central change tracking server 102 enables such features and advantages, notwithstanding the potentially large number of software objects deployed within the IT landscape, as well as their various dependencies to one another and to human operators authorized to implement changes thereto.

Thus, in the example of FIG. 1, software objects, including any changeable unit of software (including a coding or configuration thereof) that can be deployed, may be developed, tested, and released as part of collections or groups of software objects for use in the productive systems 112a, 112b. Consequently, although not explicitly illustrated, each of the systems 108/110/112 should be understood to include appropriate memories for use in the local or remote storage of associated objects, as well as corresponding hardware/software which might be necessary or helpful in implementing appropriate updates, configurations, or other changes thereto. In this context, as referenced above, the various agents 106a-106f may be installed, and may be configured to collect or otherwise determine relevant changes to associated objects, and to thereafter publish or otherwise transmit records of such changes to the central change tracking server 102.

Detailed examples of such changes are provided below, but in general, it may be appreciated that such changes may relate to any alteration of the content or configuration of a specific object, and that resulting, recorded object change data may be intermittently or instantly sent to the central change tracking server 102. That is, and some examples, to various agents 106a-106f may be configured to collect batches of object change data over time, and to transmit the object change data to the central change tracking server 102 at pre-specified intervals of time, and/or at pre-specified threshold quantities of selected object change data. In other example implementations, the agent 106a-106f may continuously stream the object changed data as the object change data becomes available.

In the example of FIG. 1, agents 106a-106f may interface with an update handler 114 configured to execute at the central change tracking server 102. For example, the update handler 114 may represent or include an application program interface (API) which is configured to communicate with each of the agents 106a-106f, and to process received objects change data in a manner which facilitates further operations of the central change tracking server 102, as described herein.

In particular, the update handler 114 may be configured to provide instructions to a change data manager 116 which is configured to interact with a database of change data 118. As also described in more detail below, by arranging the recorded objects' change data within the change data database 118 and in an ordered/structured fashion, the object change data, and related information, may be made available, e.g., for searching thereof, to a user of the central change tracking server 102 by way of a user interface 120, in a manner which is fast and convenient for the user. In particular, as described and illustrated below in more detail with respect to FIGS. 9-12, the user interface 120 may represent virtually any graphical user interface configured to be viewed by the user, and to receive input from the user and provide information related to object change data therewith. For example, the user interface 120 may include a suitably configured browser application, or a proprietary user interface designed for implementation in conjunction with the central change tracking server 102.

In practice, the change data manager 116 may be understood to represent or include functionality associated with a traditional database management system (DBMS), where such database management functionality may be understood to be executed with respect to the change data 118, in response to an instruction from the update handler 114. For example, the change data manager 116 may be configured to perform appropriate updates, insertions, deletions, and other modifications of data within the change data 118.

Further, the change data manager 116 may be configured to facilitate queries executed against the change data 118. For example, the change data manager 116 may be configured to construct one or more indexes to facilitate searching of the change data 118, as well as associated functionality for utilizing such indexes during the execution of such searches. It will be appreciated that, to the extent that such DBMS functionality is otherwise conventional in the art, it is not described herein in more detail, except as may be necessary or helpful in understanding features and functions of the system 100 in FIG. 1.

Thus, in example of FIG. 1, the change data manager 116 may be configured to receive queries by way of a query handler 120a associated with the user interface 120. For example, as described in more detail below, the user of the central change tracking server 102 may wish to know a status of a particular object or objects, information about whether/when/how a particular object was changed, a nature of relationships between changes to different objects, or virtually any other information related to object change data which might be stored within the change data database 118. Corresponding input techniques may be provided to the user (e.g., text entry, dropdown menus, or other graphical selection tools which might be provided using the user interface 120, some examples of which are provided below with respect to FIGS. 9-12), to thereby provide desired query parameters.

The change data manager 116 may communicate with the query handler 120a in order to receive the query parameters, and, as described above, may thereafter interact with the change data 118 to extract the specified object change data. Thereafter, the database change data manager 116 may communicate with a response generator 120b associated with the user interface 120, which may be configured to graphically represent or otherwise provide the results (or a subset thereof) obtained by the change data manager 116 from the change data 118. In this way, the user may be enabled to quickly and efficiently retrieve object-level data from anywhere across the entirety of the landscape 104.

In various implementations, the change data 118 may include various types or categories of change data. For example, a catalog 118a may be included which is configured to store object change data for each object which is static or which changes relatively infrequently. For example, the catalog 118a may include object-related data such as a unique identifier of an individual object, or at time of creation of the object.

Meanwhile, a tracking database 118b may store tracking data which represents current and/or dynamic object change data. For example, such object change data may include a timestamp or other characteristic of a recent change to an individual software object. For objects which undergo a plurality of such changes over time, the tracking database 118b thus stores and maintains object change data which would otherwise be lost over the course of time, yet which may be instrumental for many purposes (e.g., diagnosing a point of failure within the landscape 104, or otherwise obtaining or optimizing desired operations of the landscape 104.

Thus, over time, it may be appreciated that the tracking data within the tracking database 118b may accumulate in large amounts. Moreover, a relevance or utility of such tracking data may (or may not) become lower over time (e.g., may become stale with respect to current or future operations of the landscape 104). Consequently, the change data 118 also may include historical change data 118c, which represents relatively long term storage of object change data. For example, in terms of optimizing the system 100, the historical change data 118c may be stored utilizing a larger, slower, generally less expensive form of memory, relative to the memory used in storing tracking data in the tracking database 118b. Thus, the historical change data 118c still may be accessible by the change data manager 118 and the query handler 120a, but may require relatively longer amounts of time to retrieve than the tracking data of the tracking database 118b, or the current but more static information stored in the catalog 118a.

In executing queries against some or all of the change data 118, it may occur that some queries may be fulfilled simply by retrieving one or more specified object records from the change data 118. However, in other examples, queries may specify, or require, relationships between two or more object records. Consequently, appropriate analysis and tracking logic 122 may be included which considers such inter-object relationships. For example, certain deployment conditions may only be met if multiple objects are deployed within a certain total time window. In other examples, as also referenced above, that processes and associated rules may be in place governing a propagation of objects within and among the landscape 104, e.g., from the development system 108a to the test system 110a to the productive system 112a. Thus, in this regard, the analysis in tracking logic 122 may be configured to analyze the change data 118 as needed, based on a particular query received from the query handler 120a, in order to ensure that the corresponding propagation rules/processes have been followed (or, conversely, to determine an extent to which the rules/processes have not been followed).

Thus, the central change tracking server 102 may be configured to determine which objects within the landscape 104 are changed, by whom, as well as when and where such changes occur. Furthermore, a progress of a propagation of each object within the landscape 104 may be retrieved, through the recording of the changed object information (e.g., who, when, what, and where such changes occurred) as well as the deployment information (e.g., who, when, what, and where such deployment occurs) for any and all objects across the landscape 104. In this regard, it may be appreciated that although the simplified example and explanation provided with respect to the landscape 104 is provided above, it may occur that a given one of these systems 108/110/112 may be configured to provide multiple roles (for example, a bug fix may also be performed in the productive systems 112a, 112b. Nonetheless, the central change tracking server 102 may be configured to record all such changes and related information within the change data 118, for fast and efficient access thereto by way of the user interface 120.

As referenced above, FIG. 1 provides a simplified example for the sake of explanation, and many additional alternative implementations of system 100 may be implemented. For example, the central change tracking server 102 is illustrated and described through the use of a number of discrete components. However, it may be appreciated that any two or more components may be executed using a single component, while, conversely, a single component may be executed using two or more separate subcomponents.

Moreover, functionality described with respect to a particular component may be performed in whole or in part by another component. For example, in the examples above, the update handler 114 is described as providing instructions to the change data manager 116 for use in updating the change data 118. However, in other example implementations, the update handler 114 may simply provide a medium for communication between the agents 106a-106f and the change data manager 116, so that the change data manager 116 may be responsible for determining whether and how the change data 118 should be updated. For example, as described in more detail below with respect to FIGS. 3a and 4, the update handler 114 and/or the change data manager 116 may be responsible for determining a proper classification of information received from the agents 106a-106f as belonging to one or more of the catalog 118a, the tracking database 118b, or the historical change data 118c. Similarly, it may occur that some functionality described above with respect to the query handler 120a may be executed in whole or in part using the change data manager 116. Many other variations and implementations of the system of FIG. 1 are referenced below, or would be apparent to one of skill in the art.

Figure 2:
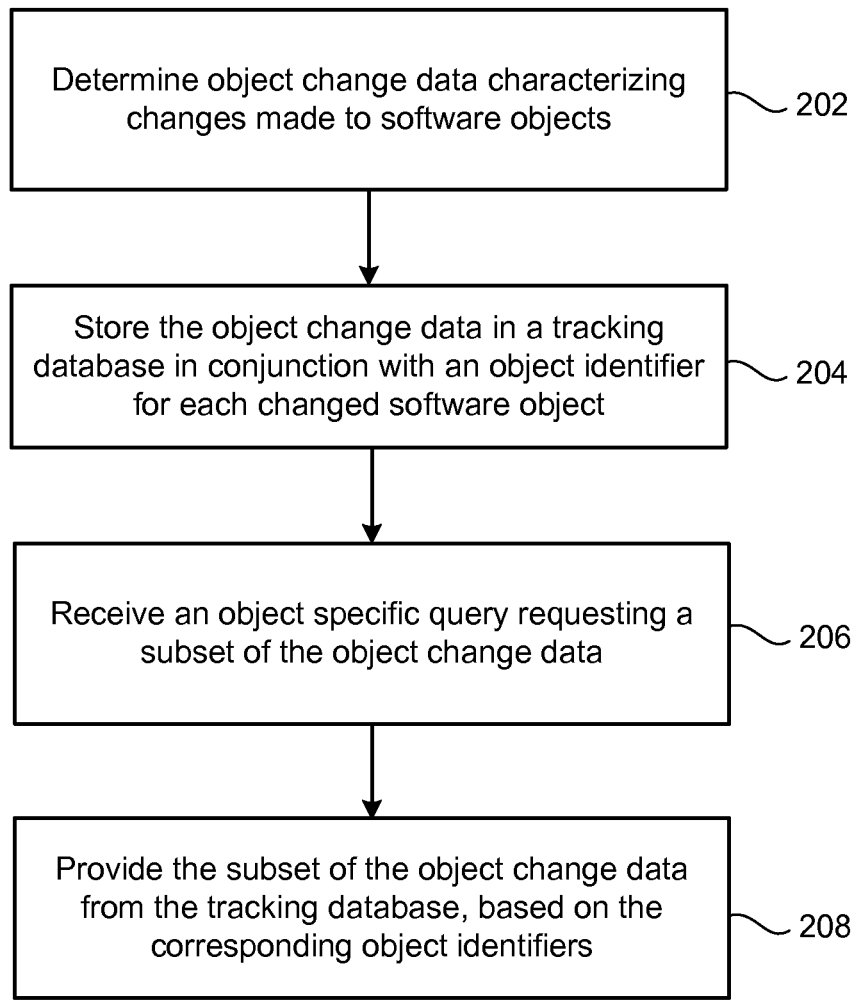
FIG. 2 is a flowchart illustrating example operations of the system in FIG. 1.

FIG. 2 is a flowchart 200 illustrating example operations of the system 100 of FIG. 1. In the example of FIG. 2, operations 202-208 are illustrated as separate, sequential operations. However, it may be appreciated that the flowchart 200 may include additional or alternative operations, not specifically illustrated therein, and that any two or more such operations may be executed in a partially or completely overlapping or parallel manner. Moreover, such operations may be executed in a different order than that shown, and/or in a nested, iterative, or looped fashion.

In the example of FIG. 2, object change data characterizing changes made to software objects may be determined (202). For example, the update handler 114 may be configured to receive object change data updates from one or more of the various agents 106a-106f. Moreover, not withstanding the examples described above with respect to FIG. 1, in additional or alternative implementations, the update handler 114 may actively request updates from one or more systems within the landscape 104. In such implementations, the landscape system in question may therefore not be required to install and execute some or all of the local instance of the software of the agents 106a-106f. However, such implementations may not provide updates to the change data 118 in a manner that is as timely or as complete as the illustrated implementation shown in FIG. 1.

The object change data may be stored in a tracking database in conjunction with an object identifier for each changed software object (204). For example, the change data manager 116 may be configured to store such object change data within the tracking database 118b. As described here, such tracking data may be stored in the tracking database 118b in a manner which facilitates subsequent queries against the tracking database 118b. In particular, as is referenced, relevant objects may be stored within a tracking 118b in conjunction with individual, unique object identifiers which correspond thereto.

An object-specific query requesting a subset of the object change data may be received (206). For example, the query handler 120a of the user interface 120 may receive such an object-specific query from a user of the central change server 102, by way of the user interface 120. In this context, it may be appreciated that the term object-specific query may refer to any query which is satisfied using data from the tracking database 118b, and which is unique to an individual software object. Nonetheless, it may be appreciated that in various environments, and depending on the nature of the received query, queries may be received and processed which relate primarily to higher levels of operations of the landscape 104. For example, queries may be received with respect to the development system 108a, or with respect to all available test systems 110a, 110b. Nonetheless, even for such queries which specify required object change data at a system, process, or subsystem level, be object specific data within the tracking database 118b may be understood to enable all such queries and associated responses, based on the individual relationships between the stored tracking data and associated software objects within the landscape 104.

The subset of the object change data may be provided from the tracking database, based on the corresponding object identifiers (208). For example, the response generator 120b of the user interface 120 may be configured to retrieve the desired subset of the tracking data from the tracking database 118b (perhaps with assistance from the change data manager 116), and to generate a graphical representation of the resulting response data, using the user interface 120. In this context, and similar to the comments above, the subset of the object change data may be understood to represent, e.g., either a literal subset of data records from tracking database 118b, or a representation of higher level information within the landscape 104, provided directly or indirectly by way of the subset of the object change data.

Figure 3A:
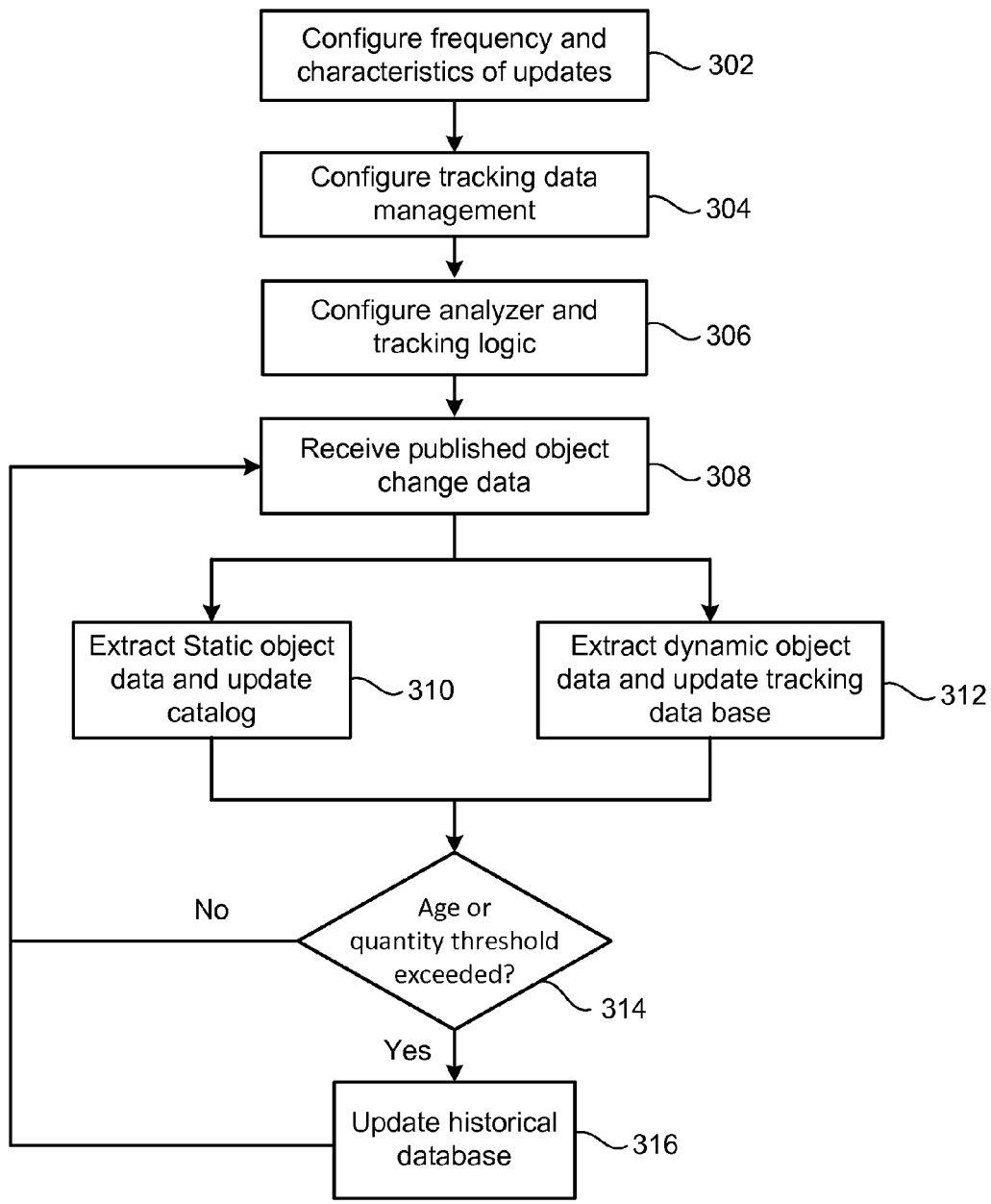
FIG. 3A is a flowchart illustrating more detailed example operations related to configuration of the system in FIG. 1.

FIG. 3a is a flowchart 300a illustrating example operations of the system 100 in FIG. 1 in the context of configuring and executing actions of the agents 106a-106f and corresponding actions of the update handler 114. For example, in the example of FIG. 3, a frequency and characteristics of updates to be provided by one or more of the agents 106a-106f may be configured and stored (302). As may be appreciated, the update handler 114 or other component of the central change tracking server 102 may be accessed by a user in order to interact with, e.g., send instructions to, various installed agents 106a-106f.

Tracking data management may be configured (304). For example, update handler 114 and/or the change data manager 116 may be configured to provide the various types of change data 118 described herein. To provide a few examples, the change data 118 may be configured in the subsections described and answered with respect to FIG. 1 (118a-118c), or in various other additional alternative data structures.

Moreover, within such contexts, associated techniques for updating or otherwise maintaining the change data 118 also may be configured.

The analysis and tracking logic 122 may be configured (306). For example, the analysis and tracking logic 122 may be programmed to include characteristics of various types of interactions and relationships between various software objects or categories of software objects, as well as characteristics of the various processes/rules designed to govern a creation, propagation, and deployment of a particular software object. The analysis and tracking logic 122 may be configured to recognize a need for a particular aspect of such tracking/analysis algorithms, based on explicit or implicit characteristics of the received query.

Then, published object change data may be received (308). For example, the update handler 114 may be configured to receive object change data from any and all of the agents 106a-106f.

Static object data may then be extracted for updating of the catalog 118a (310). For example, such extraction may be executed in whole or in part at either or both of the updated handler 114 and/or the change data manager 116. In either case, the change data manager 116 may be configured to update the catalog 118a appropriately using object specific static data published in conjunction with a corresponding software object.

Somewhat similarly, dynamic object data may be extracted, and the tracking database 118b may be updated accordingly (312). For example, again, the update handler 114 may be configured to differentiate such dynamic object data from the types of static object data just referenced. Then, as with the updates of the catalog 118a with extracted static object data as just described, the change data manager 116 also may be configured to execute corresponding updates of the tracking database 118b with the extracted dynamic object data. Specific examples of static object data and dynamic object data are provided in detail below, e.g., with respect to FIG. 4.

As long as an age or quantity-based threshold has not been exceeded (314) with respect to the tracking database 118b, then the system 100 may continue to receive published object change data in real time or near real time (308). That is, as long as an age of tracking data within the tracking database 118b does not exceed certain threshold, and/or as long as a total quantity of object change data stored within the tracking database 118b does not exceed a specified amount, then operations may continue.

On the other hand, if an age or quantity (or other defined characteristic) of the object change data server within the tracking database 118b exceeds a predefined threshold level (314), then the historical change data 118c may be updated (316). That is, for example, the change data manager 116 may be configured to extract an oldest subject of the object change data stored in the tracking database 118b and transfer related, stored data to the historical change data 118c. Accordingly, as already described, the tracking database 119b may be implemented using a relatively fast and expensive memory for implementation of the tracking database 118b. Consequently, queries against the tracking database 118b may be executed quickly and efficiently, including utilization of the analysis and tracking logic 122 and conjunction therewith.

Figure 3B:
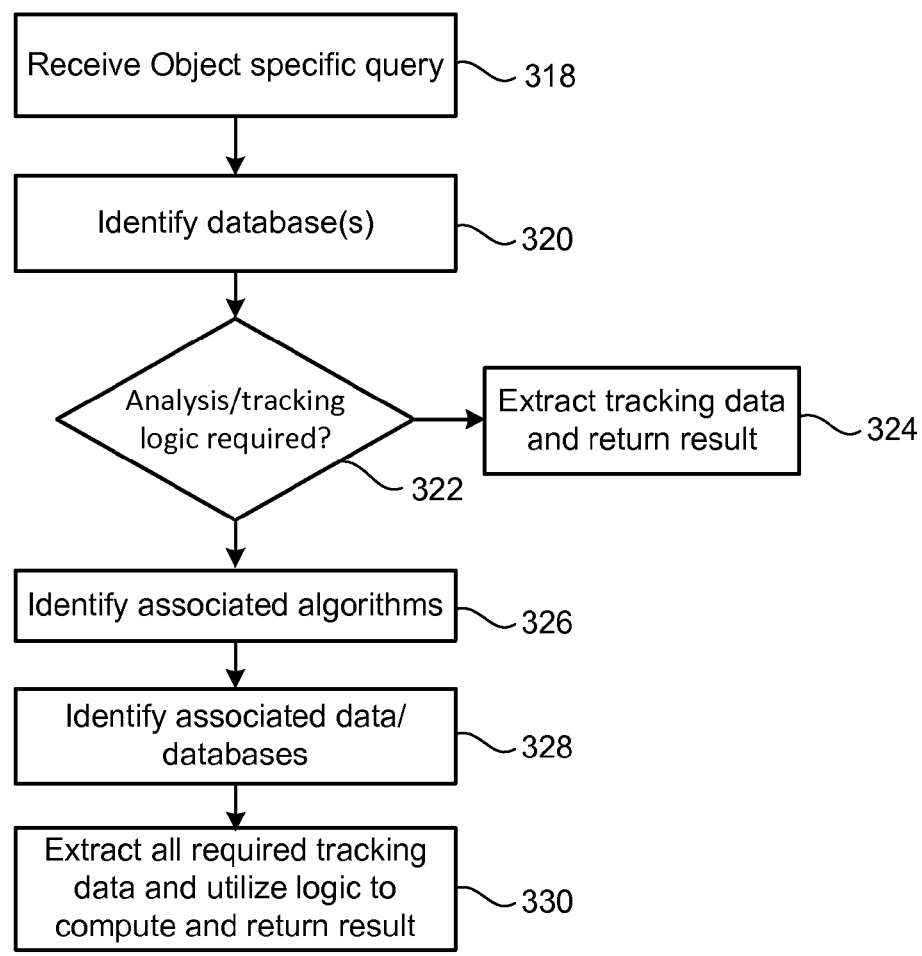
FIG. 3B is a flowchart illustrating more detailed example operations related to an operation of the system in FIG. 1.

FIG. 3b is a flowchart 300b illustrating example operation of system 100 of FIG. 1 during executions of the central change tracking server 102 in receiving and responding to object-specific queries. Specifically, as shown, an object-query may be received (318), e.g., by way of the query handler 120a and the associated user interface 120.

Relevant change data databases may be identified, based on the query (320). For example, the query handler 120a may be configured to determine that any or all of the change data 118a/118b/118c may be required to satisfy the received object-specific query.

If the analysis of tracking logic 122 is not required (322), then relevant tracking data may be extracted from the tracking database 22b and returned to the user by way of the response handler 120b of the user interface 120 (324). Otherwise, if the analysis/tracking logic is desired or required (322), then the analysis and tracking logic 122 may be configured to identity potentially relevant algorithms (326).

Then, associated data/databases may be identified (328). That is, such identification may take place in addition to, or instead of, earlier operation (320) associated with identification of relevant databases (328). For example, it may occur that an initial receipt of the query is determined to be associated with currently object change data recorded within the tracking database 118b, and that associated analysis/tracking logic may be required, and may specify certain object change data already stored within the historical change data 118c.

Subsequently, all required tracking data for the related object change data may be extracted, and the analysis/tracking logic 122 may be further configured to provide, in conjunction with the response generator 120b, a calculation in representation of the determined response to the query received from the query handler 120b.

Figure 4:
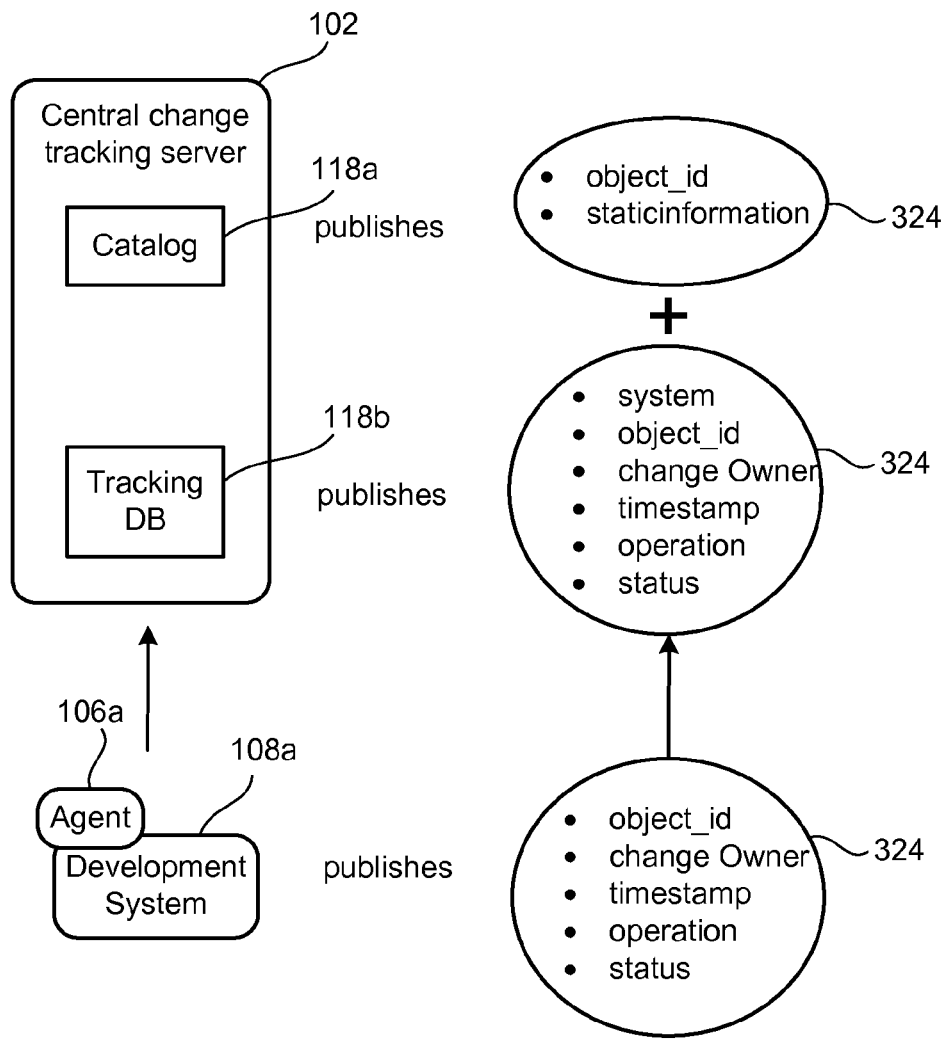
FIG. 4 is a block diagram illustrating a data flow of object change data within the system of FIG. 1.

FIG. 4 is a block diagram illustrating an example data flow which may be experienced by the system 100 of FIG. 1. That is, for example, consistent with the above description and explanation provided with respect to FIGS. 1-3b, it may be appreciated that the example agent 106a installed in the context of the development system 108a may be configured to publish object change data 402 for consumption by the central change tracking server 102.

More specifically, as shown, the object change data published by the agent 106a may include, e.g., an individual/unique object ID representing an identifier of the software object corresponding to the object change data 402. Further, the object change data 402 may include an owner of the change in question, e.g., an engineer, administrator, or other authorized user responsible for the initiation and execution of the relevant change to the specific software object. Further, the object change data may include a timestamp representing a time of the relevant object change, along with definitions of one or more associated operations, and a current status of the object change at a time of publication of the object change data 402.

As described above, the object change data 402 may include dynamic change data 404, as well as static change data 406. As shown and described, the tracking database 118b may be responsible for persisting the dynamic change data 404, e.g., the system-related information, and so on with the identification of the change owner, the timestamp, and the operation and status information. Meanwhile, as shown and described, the catalog 118a may be responsible for persisting all other static information associated with the individual object.

TABLE 1 provides additional example details regarding the object change data 402/404/406 as it is published/persisted at each of the agent 106a, the tracking database 118b, and the catalog 118a. Of course, in the example of TABLE 1, it will be appreciated that the various included database entries and associated descriptions are intended merely as non-limiting examples, and that various other additional or alternative entries/descriptions may be included, as well.

TABLE 1

| Component | Entry | Description |
| --- | --- | --- |
| Agent | Object ID | The unique ID of an object changed or deployed, published from the client system via the agent to the central server |
| | Change Owner | The user, which is performing the change or the deployment in the client system |
| | Timestamp | GMT timestamp of the performed operation (change/deploy) |
| | Operation | Type of the operation performed (values: DEPLOY, CHANGE) |
| | Status | Actual status of the operation performed in the client (values: RUNNING, WAITING, FINISHED) |
| Tracking DB | System | The system identifier of the source of the notification |
| | Object ID | The unique ID of an object changed or deployed, unique key to perform calculations |
| | Change Owner | The user, which is performing the change or the deployment in the client system |
| | Timestamp | GMT timestamp of the performed operation (change/deploy) |
| | Operation | Type of the operation performed (values: DEPLOY, CHANGE) |
| | Status | Actual status of the operation performed in the client (values: RUNNING, WAITING, FINISHED) |
| Catalog | Object ID | The unique ID of an object changed or deployed, unique key to perform calculations |
| | Static Information | Object name and description, object type, any other additional meta information - retrieved from client system once - pulled, not published |

Figure 5:
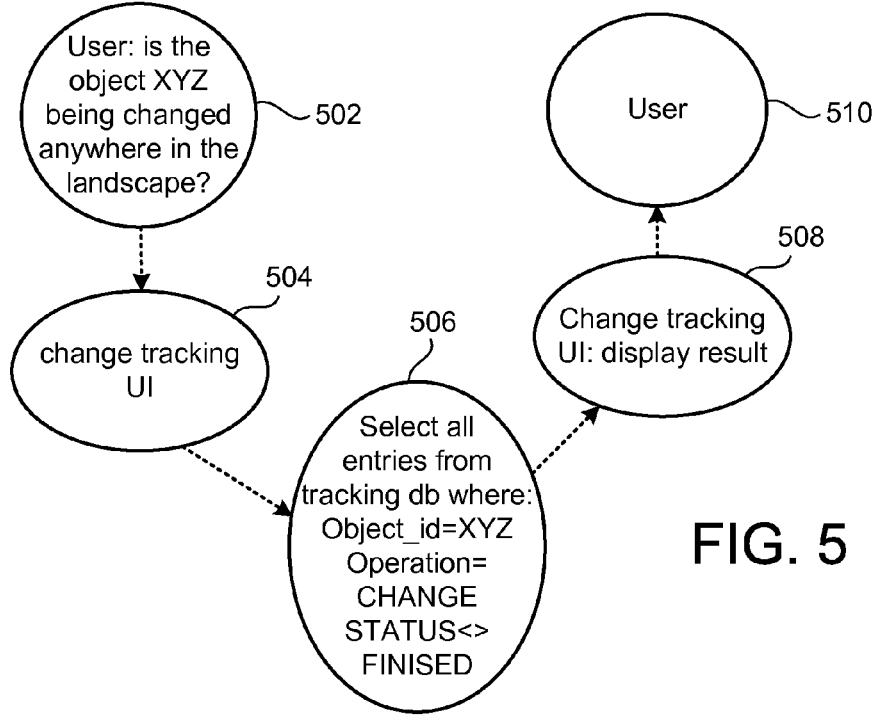
FIG. 5 is a block diagram of a first query performed using the system in FIG. 1.

FIG. 5 is a diagram of a first query executed by the system 100 in FIG. 1. More specifically, in the example of FIG. 5, a query 502 is received from a user by way of the user interface 120, as shown at block 504, which asks whether an example object XYZ is being changed anywhere in the landscape 104. Upon entry of the example query using the user interface 120, the request handler 120a and/or the change data manager 116 may, as shown as block 506, perform a selection of all entries with the included object ID and stored in conjunction with the operation "change" from the tracking database 118b.

The query result, as obtained by the change data manager 116 and/or the response generator 120b, and as displayed using the user interface 120 by the response generator 120b, as shown at the block 508, will contain all systems within the landscape 104 in which the specified object is currently being changed. Advantageously, a display of the query results in this regard may occur very quickly, given that all of the change data may be persisted in the central change tracking server 102, without a need for querying the various systems of the landscape 104 at the time of the received query.

Ultimately, the query results may thus be provided to the user, as shown at block 510. In this regard, it may be appreciated that the user, and some implementations, may have direct access to the central change tracking server 102. However, more commonly, although not specifically illustrate in the example of FIG. 1, it may be appreciated that the user may be in remote network communications with the central change tracking server 102, using a computing device that is local to the user. Again, since the central change tracking server 102 is responsible for all computational and storage requirements, such remote access may be provided to the user even when the user has relatively limited local computing abilities, e.g., such as when the user is using a laptop, netbook, notebook, or smart phone or other mobile computing device), and without requiring installation of much, if any, specialized software thereon.

The query in example of FIG. 5 may thus be understood to be very helpful for, e.g., monitoring changes made to specific objects anywhere within the landscape 104. As a result, for example, it may be possible for administrators or other users to identify related issues. For example, inadvertent double maintenance of a single object by multiple users within the landscape 104 may be avoided, and unauthorized changes may be detected and halted.

Figure 6:
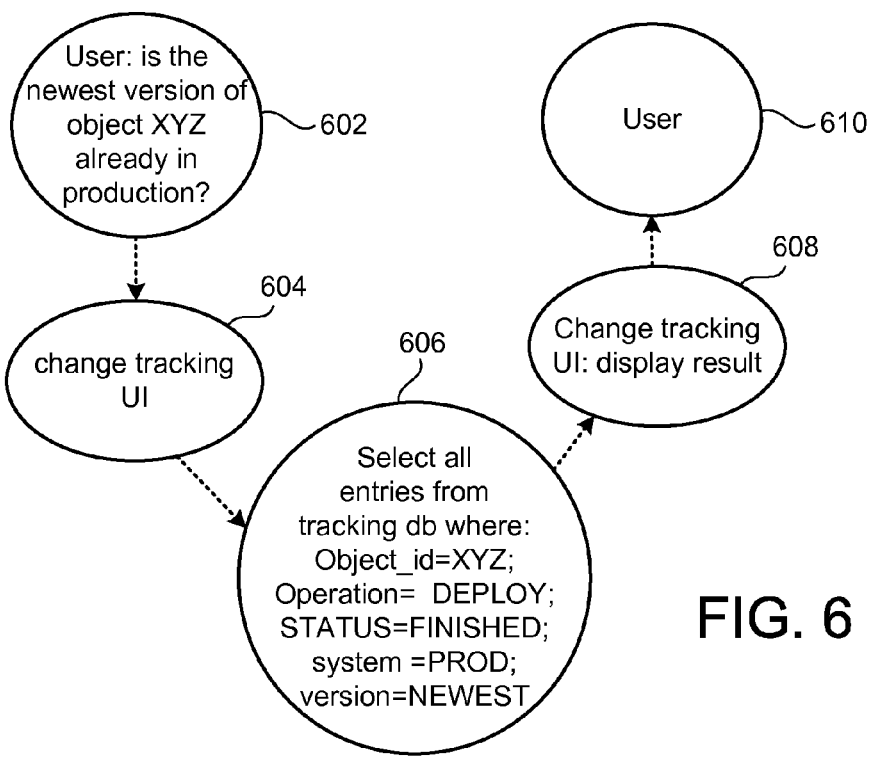
FIG. 6 is a block diagram of a second query performed using the system in FIG. 1.

FIG. 6 is a block diagram of a second query executed using the system 100 of FIG. 1. More specifically, the example query of FIG. 6 illustrates a query that may be executed to measure a progress of a project, on the assumption that the project in question may only be considered to be finished if all necessary objects have been deployed within a most-recent version of the related productive system (e.g., 112a, 112b). Thus, similarly to FIG. 5, at block 602 the user may enter the example query, "is the newest version of the object XYZ already in production?"

Then, upon receipt at the change tracking user interface 120 (604), the query handler 120a and/or the change data manager 116 may perform a selection (606) of all entries with the specified object ID, operation=DEPLOY, a status=FINISHED, a newest version of the object, and the ID or name of the relevant productive system. That is, the query may be executed against the change data 118, and the change tracking UI 120, specifically, the response generator 120b, may display a corresponding entry if the newest version of the object is deployed (608), for receipt thereof by the user (610). If the newest version of the object is not yet deployed, then the query result will not contain any results, so that a corresponding notification of the lack of results may be provided to the user instead.

Figure 7:
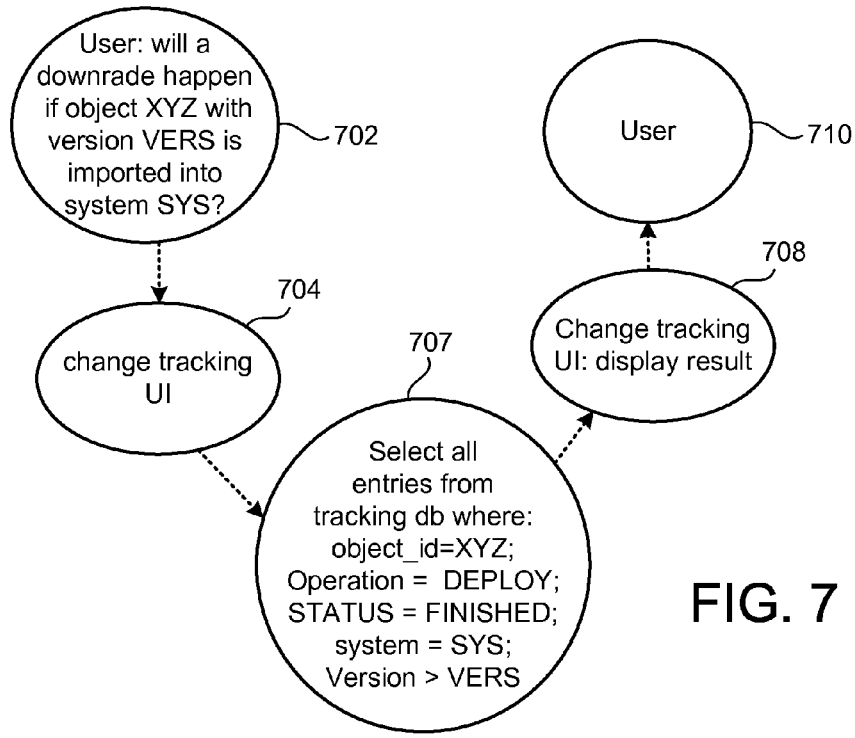
FIG. 7 is a block diagram of a third query performed by the system in FIG. 1.

FIG. 7 is a block diagram of a third example query executed using the system 100 of FIG. 1. Specifically, an example of FIG. 7 illustrates a use case in which a user queries whether a given deployment of objects might result in a system downgrade (e.g., such as when an older object is deployed in place of a newer version).

Again, the user may provide the query (702), "will the downgrade happen if object XYZ with VERS is imported into SYS?" Upon receipt at the change tracking user interface 120 (704), the query handler 120a and/or the change data manager 116 may process the query against the tracking database 118b (706).

In this regard, as described above with respective FIGS. 1 and 3A and 3B, analysis in tracking logic 122 may be utilized to determine that a downgrade will occur if a version of the object that should be deployed exists (version=VERS) while a newer version, already deployed (operation=DEPLOY, status=FINISHED), where the newer version is associated with the same object ID that with version>simple VERS.

The result of the query will be all objects that fulfill the criteria, so that if the result set is empty, no downgrade is associated, or a non-empty result set would include downgrade information. In either scenario, the change tracking UI 120, including the response generator 120B, may provide the relevant results (708), to the user (710).

Figure 8:
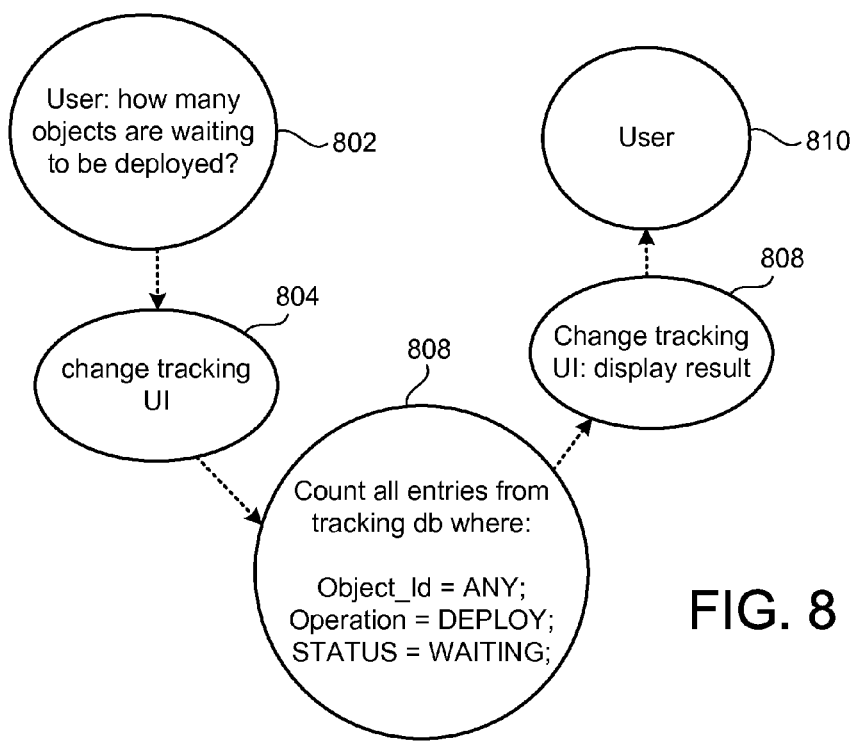
FIG. 8 is a block diagram of a fourth query performed by the system in FIG. 1.

FIG. 8 is a fourth example query that may be executed using the system 100 of FIG. 1. In FIG. 8, a query (802) "how many objects are waiting to be deployed?" may be received (804) by way of the change tracking user interface 120, e.g., by way of the query handler 120a and/or the change data manager 116. Such a query may be utilized, for example, to relate scenarios in which a high number of not-yet-deployed objects exist, and potentially indicate a high risk deployment process for future deployments. In other words, the query of FIG. 8 provides a technique for measuring a level of risk associated with the given object change.

Again, the query handler 120a and/or the change data manager 116 may be utilized to access the tracking data 118b and thereby count all not-deployed objects (i.e., object waiting to be deployed). Specifically, the query may cause a counting of all objects with operation=DEPLOY and status=WAITING (806). Thus, the result may be understood to include a number of changed objects which have not yet been deployed, where such a result set may be provided by way of the change tracking user interface 120, i.e., by using the response generator 120b, to display the results (808), to the user (810).

Figure 9:
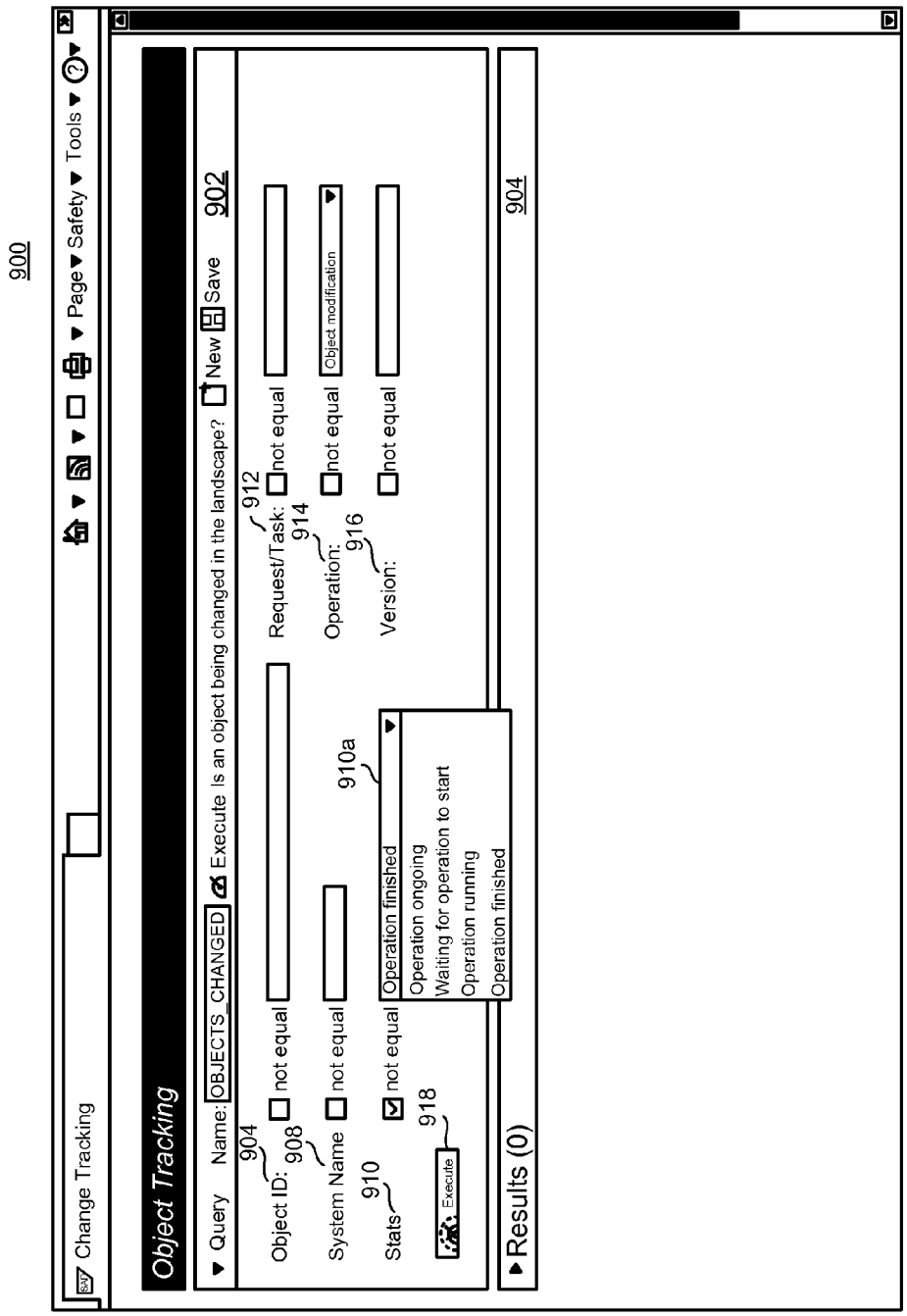
FIG. 9 is a screenshot of a query submission of the query of FIG. 5.

FIG. 9 is a screenshot 900 illustrating an example query submission for the example query of FIG. 5. As shown, a query 902 may include various user input fields 906-916, as well as execute button 918 configured to begin execution of the query. Specifically, as shown, an object ID 906 may be entered, in conjunction with a system 908. A status 910 may be selected, e.g., and example FIG. 9, using a dropdown list 910a. A request/task 912 may be specified, along with a list of available operations 914 and version 916.

Figure 10:
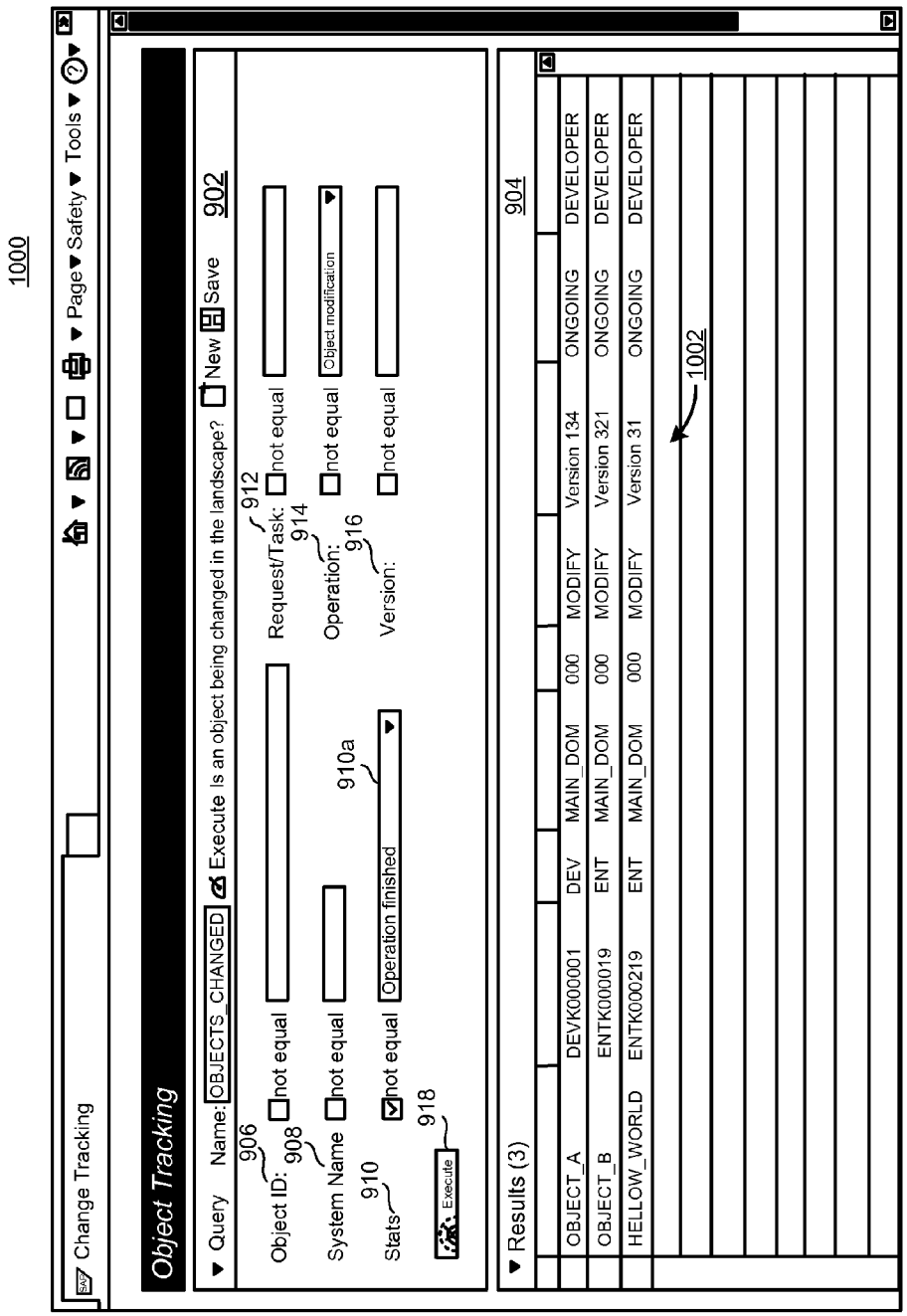
FIG. 10 is a screenshot of a query response of the query of FIG. 5.

Meanwhile, a results portion 904 may be included which, as illustrated in the related example of FIG. 10, may be used to display the corresponding query results for a query as specified in the query portion 902. That is, as shown in FIG. 10, results 1002 may be provided, e.g., relevant object IDs and associated change data, where it may be appreciated that the various items of change data generally correspond to the possible user input fields 906-916 of the query portion 902.

Figure 11:
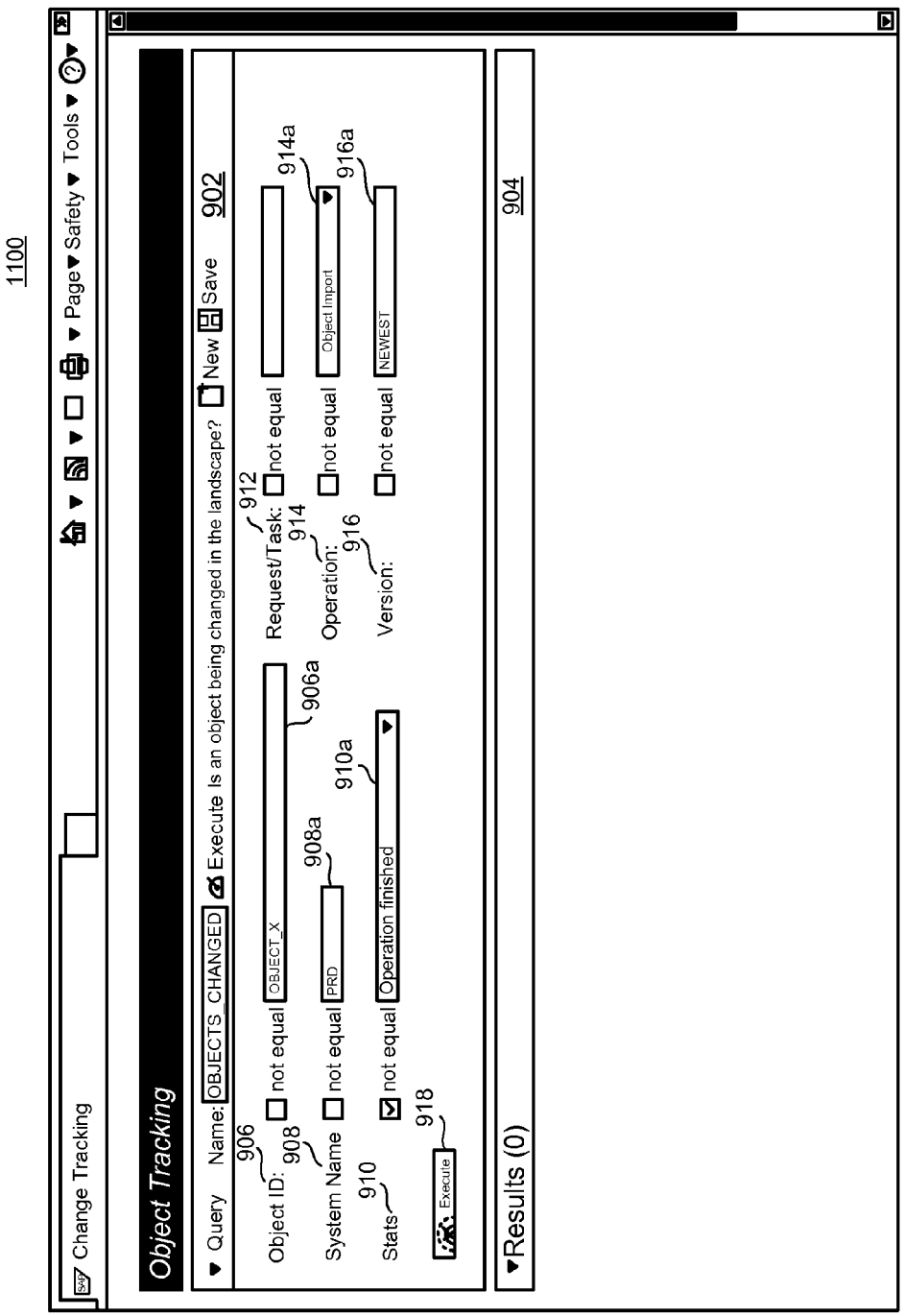
FIG. 11 is a screenshot of a query submission of the query of FIG. 6.

FIG. 11 is a screenshot 1100 illustrating an example of the query of FIG. 6. As with FIG. 9, the various user input field 906-916 are illustrated. However, in the example of FIG. 11, corresponding values for user input selections are illustrated.

Specifically, as shown, a text field 906a includes identification of an object, i.e., "object_X." A system name PRD is provided in entry field 908a, and a status "operation finish" is displayed as being selected in the dropdown menu 910a. An operation "object import" is selected in the dropdown list 914a for the operation field 914, and finally, a version "newest" is selected in the entry field 916a for the version selection 916.

Figure 12:
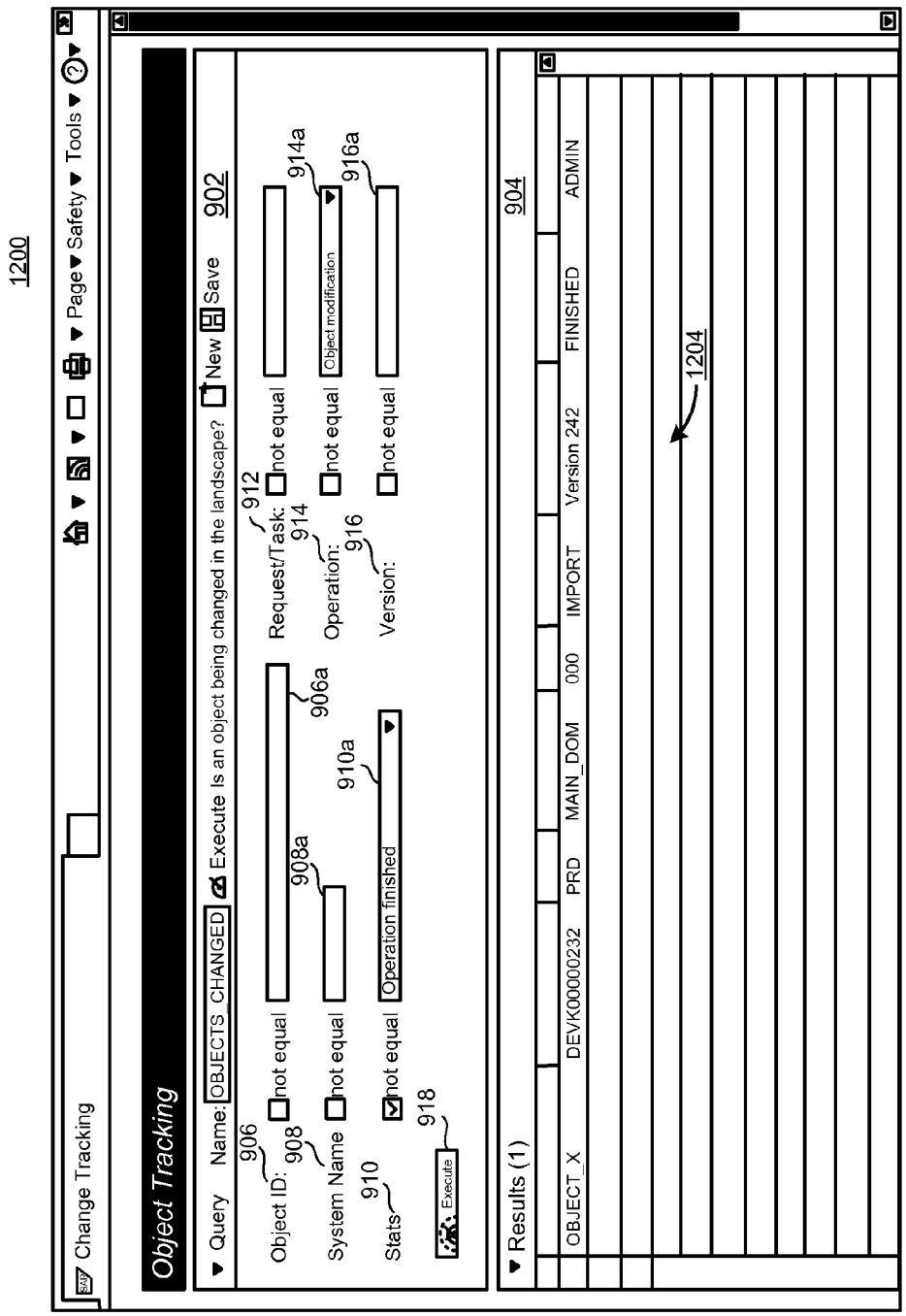
FIG. 12 is a screenshot of a query response of the query of FIG. 6.

FIG. 12 illustrates results 1204 provided within a results portion 904 in response to selection of the execute button 918 in associated submission of the defined query. As shown, the results 1204 include the specific object, object_X. Further, associated object change data is illustrated which further illustrates inclusion of the various query parameters specified in the query portion 902.

As described, the system 100 of FIG. 1, including additional or alternative implementations thereof, generally provide a central solution for change data tracking, so that, for example, a user is not required to log onto each system of landscape 104 in order to perform queries there. In addition to being time consuming and research intensive, such an approach would lack the ability to provide straight forward, meaningful, cross system results that are provided by the central change tracking server 102. Since little or no remote data retrieval is necessary at a time of a receipt of a query, even very complex tracking and analysis algorithms may be executed very quickly, providing a real time or near real time experience for the user.

Since the change tracking is executed at the most generic level, i.e., the object level, many different types of customized analysis and tracking algorithms and associated reports may be implemented, without requiring changes to the overall client-server infrastructure. For example, if an organization decides to track and monitor changes on a project level, all objects touched on the projects may bundled in the potential change tracking server 102, and instead accordingly bundled queries to the tracking database 118 may be executed. This system 100 is therefore highly flexible regarding such change bundling, such as may occur in software releases, or portions thereof, or in various associated projects. That is, all such bundles need only be implemented in conjunction with the central change tracking server 102 to identify the relevant object set and to perform queries based thereon. Moreover, all such bundles may be implemented as database views, using the change tracking database 118b.

Moreover, system 100 provides a highly scalable and transparent solution which enables straightforward identification of where, how, and when, and by whom, an object change was implemented, even for very large system landscapes. Consequently, such a highly transparent change process my be leverage to, e.g., reduce risk, identify potential negative issues early within a software development process, and to monitor the progress of any given change process.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, and executable by at least one processor, the system comprising:
    an update handler configured to cause the at least one processor to receive object change data characterizing changes made to software objects deployed and stored across an information technology (IT) landscape, and to extract, from the object change data, dynamic change data representing ongoing or current changes being made to, or current status of, the software objects, wherein the dynamic change data is received from published data that is published by agents deployed across the IT landscape;
    a change data manager configured to cause the at least one processor to store the object change data in a tracking database in conjunction with an object identifier for each changed software object, and further configured to move portions of the object change data from the tracking database to a historical database when an age thereof exceeds a pre-defined age threshold;
    a query handler configured to cause the at least one processor to receive an object-specific query requesting a subset of the object change data, the object-specific query associated with a potential change within the IT landscape, the subset including a portion of the dynamic change data related to the potential change; and
    a response generator configured to cause the at least one processor to provide the subset of the object change data from the tracking database, based on the corresponding object identifiers, the subset of the object change data indicating whether the potential change within the IT landscape should be allowed to proceed, based on the portion of the dynamic change data.

2. The system of claim 1, wherein the software objects are deployed and stored across development, test, and productive systems of the IT landscape.

3. The system of claim 2, wherein the update handler is configured to receive the object change data within the published data received from the agents deployed at the development, test, and productive systems.

4. The system of claim 1, wherein the update handler is configured to sort the object change data into static object change data for storage within a catalog, and the dynamic change data stored within the tracking database.

5. The system of claim 1, wherein the change data manager is configured to execute the query as a search against the tracking database.

6. The system of claim 1, wherein the object change data includes the current status of a corresponding software object after a content or configuration change has been made thereto.

7. The system of claim 1, wherein the change data includes a timestamp specifying a time of each change made to a corresponding object.

8. The system of claim 1, wherein the query handler is configured to receive the object-specific query by way of a graphical user interface (GUI).

9. The system of claim 8, wherein the response generator is configured to present the subset of the object change data within the GUI.

10. The system of claim 1, comprising analysis and tracking logic configured to relate object change data for multiple objects, based on the object-specific query.

11. A computer-implemented method for executing instructions stored on a non-transitory computer readable storage medium, the method comprising:
    receiving object change data characterizing changes made to software objects deployed and stored across an information technology (IT) landscape, including extracting, from the object change data, dynamic change data representing ongoing or current changes being made to, or current status of, the software objects, wherein the dynamic change data is received from published data that is published by agents deployed across the IT landscape;
    storing the object change data in a tracking database in conjunction with an object identifier for each changed software object, including moving portions of the object change data from the tracking database to a historical database when an age thereof exceeds a pre-defined age threshold;
    receiving an object-specific query requesting a subset of the object change data, the object-specific query associated with a potential change within the IT landscape, the subset including a portion of the dynamic change data related to the potential change; and
    providing the subset of the object change data from the tracking database, based on the corresponding object identifiers, the subset of the object change data indicating whether the potential change within the IT landscape should be allowed to proceed, based on the portion of the dynamic change data.

12. The method of claim 11, wherein the object change data includes the current status of a corresponding software object after a content or configuration change has been made thereto.

13. The method of claim 11, comprising sorting the object change data into static object change data for storage within a catalog, and the dynamic change data stored within the tracking database.

14. A computer program product, the computer program product being tangibly embodied on a non-transitory computer-readable storage medium and comprising instructions that, when executed, are configured to:

determine object change data characterizing changes made to software objects deployed and stored across an information technology (IT) landscape;

extract, from the object change data, dynamic change data representing ongoing or current changes being made to, or current status of, the software objects, wherein the dynamic change data is received from published data that is published by agents deployed across the IT landscape;

store the object change data in a tracking database in conjunction with an object identifier for each changed software object;

move portions of the object change data from the tracking database to a historical database when an age thereof exceeds a pre-defined age threshold;

receive an object-specific query requesting a subset of the object change data, the object-specific query associated with a potential change within the IT landscape, the subset including a portion of the dynamic change data related to the potential change; and provide the subset of the object change data from the tracking database, based on the corresponding object identifiers, the subset of the object change data indicating whether the potential change within the IT landscape should be allowed to proceed, based on the portion of the dynamic change data.

15. The computer program product of claim 14, comprising sorting the object change data into static object change data for storage within a catalog, and the dynamic change data stored within the tracking database.

16. The computer program product of claim 14, wherein the software objects are deployed and stored across development, test, and productive systems of the IT landscape.

17. The computer program product of claim 16, wherein the object change data is included within the published data received from the agents deployed at the development, test, and productive systems.

18. The computer program product of claim 14, wherein the object change data includes the current status of a corresponding software object after a content or configuration change has been made thereto.

\* \* \* \* \*